United States Patent [19]

Kanemura et al.

[11] Patent Number: 4,545,455
[45] Date of Patent: Oct. 8, 1985

[54] ANTI-SLIP APPARATUS FOR WHEELED VEHICLE

[75] Inventors: Shinji Kanemura, Asaka; Shoji Tachikawa, Iruma, both of Japan

[73] Assignee: Honda Giken Kogyo Kabushiki Kaisha, Tokyo, Japan

[21] Appl. No.: 544,575

[22] Filed: Oct. 24, 1983

[30] Foreign Application Priority Data

Oct. 27, 1982 [JP] Japan ................................ 57-188674
Nov. 2, 1982 [JP] Japan ................................ 57-192810
Nov. 5, 1982 [JP] Japan ................................ 57-194434

[51] Int. Cl.$^4$ ............................................ B60K 31/00
[52] U.S. Cl. ...................................... 180/197; 74/489; 74/505; 74/675; 123/198 D; 123/198 DB; 180/219; 180/335
[58] Field of Search ............... 180/197, 218, 219, 230, 180/6.48, 335; 74/489, 505, 675; 123/198 D, 198 DB, 332, 340, 342

[56] References Cited

U.S. PATENT DOCUMENTS 2,906,356  9/1959  Richard ............................. 180/6.48
3,684,047  7/1972  Zeisloft et al. ...................... 180/197
3,776,357  12/1973  Arai et al. ........................... 180/197
4,352,303  10/1982  Christner ......................... 180/219 X

FOREIGN PATENT DOCUMENTS 1224683  3/1971  United Kingdom ........ 123/198 DB

Primary Examiner—Joseph F. Peters, Jr.
Assistant Examiner—Mitchell J. Hill
Attorney, Agent, or Firm—Darby & Darby

[57] ABSTRACT

An anti-slip apparatus is provided for controlling a slip rate of a drive wheel of a wheeled vehicle to the optimum level. The vehicle has an engine, a fuel control device for controlling a supply of fuel-air mixture to the engine, and an accelerator member operatively connected to the fuel control device by an operating wire. Drive and driven wheel speed sensors sense the rotational speeds of the drive and driven wheels of the vehicle, respectively. A wire control device is operatively connected to the drive and driven wheel speed sensors and is operable to activate the operating wire to reduce the supply of fuel-air mixture from the fuel control device to the engine when the ratio of the rotational speed of the drive wheel to the rotational speed of the driven wheel exceeds a predetermined level.

7 Claims, 10 Drawing Figures

ANTI-SLIP APPARATUS FOR WHEELED VEHICLE

BACKGROUND OF THE INVENTION

1. Field of the Invention

This invention relates to an anti-slip apparatus for controlling the rotational speed of a drive wheel of a vehicle.

2. Prior Art

Recently, in the manufacture of a wheeled vehicle such as a motorcycle and a motor car, an engine portion and a frame or chassis have been improved to enhance a running performance of the vehicle on bad roads such as a muddy road and a snow-laden road. A tire traction, which is the ability to convert a rotational force of the drive wheel into a propelling force, can be enhanced to a certain extent by improving a pattern of the tire tread. Despite such improvements, when abruptly accelerating the vehicle, the drive wheel is still subjected to undue slip, so that the maximum tire traction can not be achieved. Thus, the drive wheel runs idle under such a condition so that a fuel consumption rate is worsened. It is known in the art that the maximum tire traction can be obtained when a slip rate of the drive wheel is at a predetermined level, for example, 5 to 10%.

SUMMARY OF THE INVENTION

It is therefore an object of this invention to provide an anti-slip apparatus for a wheeled vehicle by which the slip of a drive wheel of the vehicle is controlled to the optimum level to produce the maximum tire traction.

According to the present invention, there is provided an anti-slip apparatus for a wheeled vehicle having a drive wheel, a driven wheel, an engine, a fuel control means for controlling a supply of fuel-air mixture to the engine, and an accelerator means operatively connected to the fuel control means by an operating wire, which apparatus comprises a drive wheel speed sensor for sensing a rotational speed of the drive wheel; a driven wheel speed sensor for sensing a rotational speed of the driven wheel; and a wire control means operatively connected to said drive and driven wheel speed sensors and operable to activate the operating wire to reduce the supply of fuel-air mixture from the fuel control means to the engine when the ratio of the rotational speed of the drive wheel to the rotational speed of the driven wheel exceeds a predetermined level.

DESCRIPTION OF THE PREFERRED EMBODIMENTS OF THE INVENTION

Figure 1:
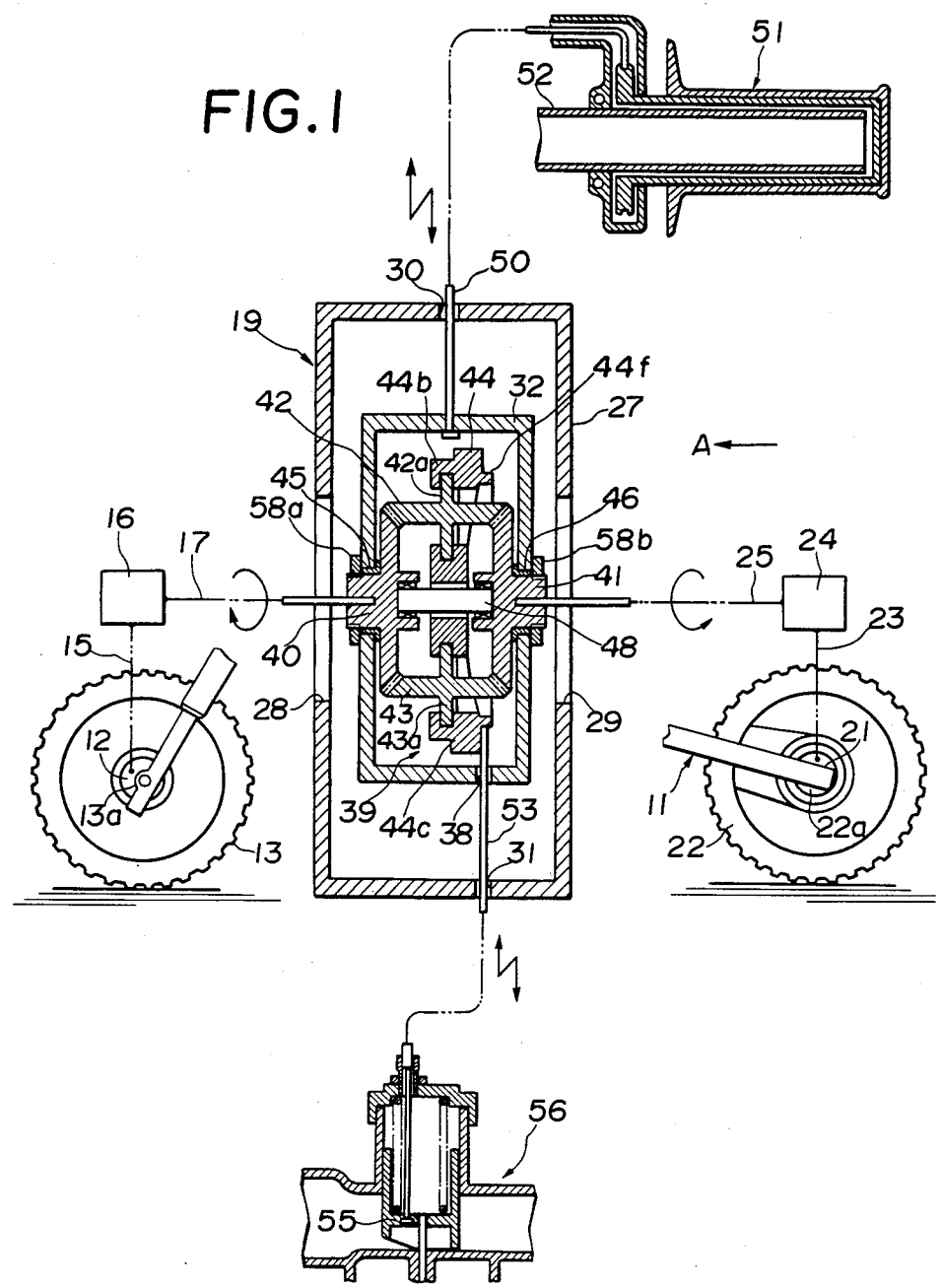
FIG. 1 is a schematic view of a motorcycle incorporating an anti-slip apparatus provided in accordance with the present invention.

Like reference numerals denote corresponding parts in several views.

FIG. 1 diagrammatically shows a motorcycle 11 provided with an anti-slip apparatus according to the present invention. A front wheel speed sensor 12 is mounted on a front axle portion 13a of the motorcycle 11 for sensing the rotational speed of a front or driven wheel 13. The front wheel speed sensor 12 is of the conventional type and comprises a first gear (not shown) mounted on the front axle for rotation with the front wheel 13, and a sensor wire 15 mounted on a frame of the motorcycle 11 and having a second gear (not shown) fixed to one end thereof. The second gear is in mesh with the first gear so that the sensor wire 15 is rotated about its longitudinal axis in synchronism with the rotation of the front wheel. A speed reducer 16 which comprises a train of gears is mounted on the frame of the motorcycle 11, and the other end of the sensor wire 15 remote from the second gear is connected to the input side of the speed reducer 16. A connecting wire 17 is connected at its one end to the output side of the speed reducer 16 while the other end of the connecting wire 17 is connected to a throttle wire control mechanism 19 as hereinafter more fully described. Thus, the rotational speed of the front wheel 13 is sensed by the front wheel speed sensor 12 and is converted to the rotation of the sensor wire 15 which in turn is reduced by the speed reducer 16 and transmitted to the throttle wire control mechanism 19 through the wire 17.

A rear wheel speed sensor 21 is mounted on a rear axle portion 22a of the motorcycle 11 for sensing the rotational speed of a rear or drive wheel 22. The rear wheel speed sensor 21 is identical in construction to the front wheel speed sensor 12. The rotation of the rear wheel 22 is transmitted to the throttle wire control mechanism 19 through a sensor wire 23, a speed reducer 24 and a connecting wire 25, as described above for the front wheel speed sensor 12. Thus, the rotational speed of the rear wheel 22 is sensed by the rear wheel speed sensor 21 and is converted to the rotation of the sensor wire 23 which in turn is reduced by the speed reducer 24 and transmitted to the throttle wire control mechanism 19 through the connecting wire 25.

The ratio of the reduction ratio of the speed reducer 16 to the reduction ratio of the speed reducer 24 is predetermined in accordance with the optimum rate of slip of the rear wheel 22 relative to the road or ground, and this ratio is, for example, 1 to 1.1 or 1 to 1.15. The optimum slip rate of the rear wheel 22 is determined in accordance with the kind and purpose of the motorcycle. More specifically, when the slip rate of the rear wheel 22 of the running motorcycle 11 is at the optimum level, the ratio of the rotational speed of the front wheel 13 to the rotational speed of the rear wheel 22 is equal to the ratio of the reduction ratio of the speed reducer 16 to the reduction ratio of the speed reducer 24, so that the connecting wires 17 and 25 are rotated at the same speed. As viewed in a direction indicated by an arrow A in FIG. 1, the connecting wire 17 is rotated in a clockwise direction while the connecting wire 25 is rotated in a counterclockwise direction.

Figure 2:
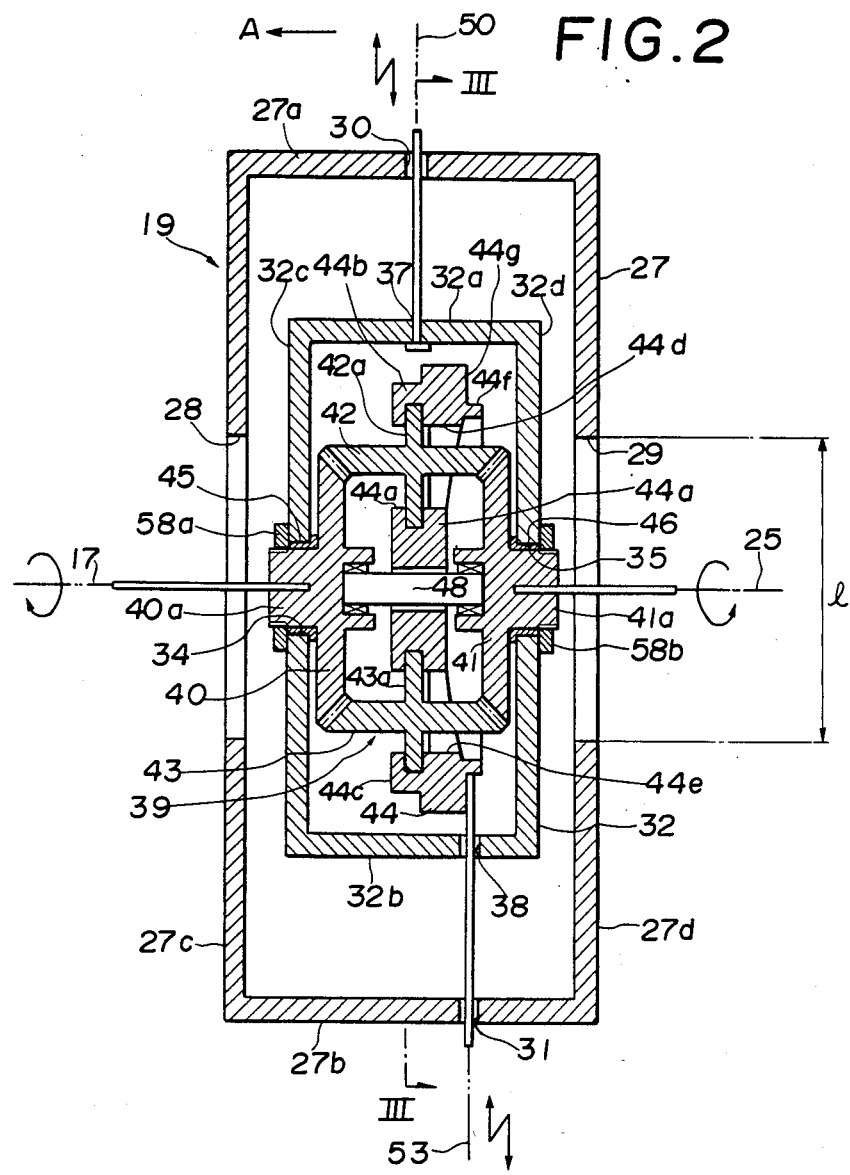
FIG. 2 is a cross-sectional view of a throttle wire control mechanism incorporated in the anti-slip apparatus.
Figure 3:
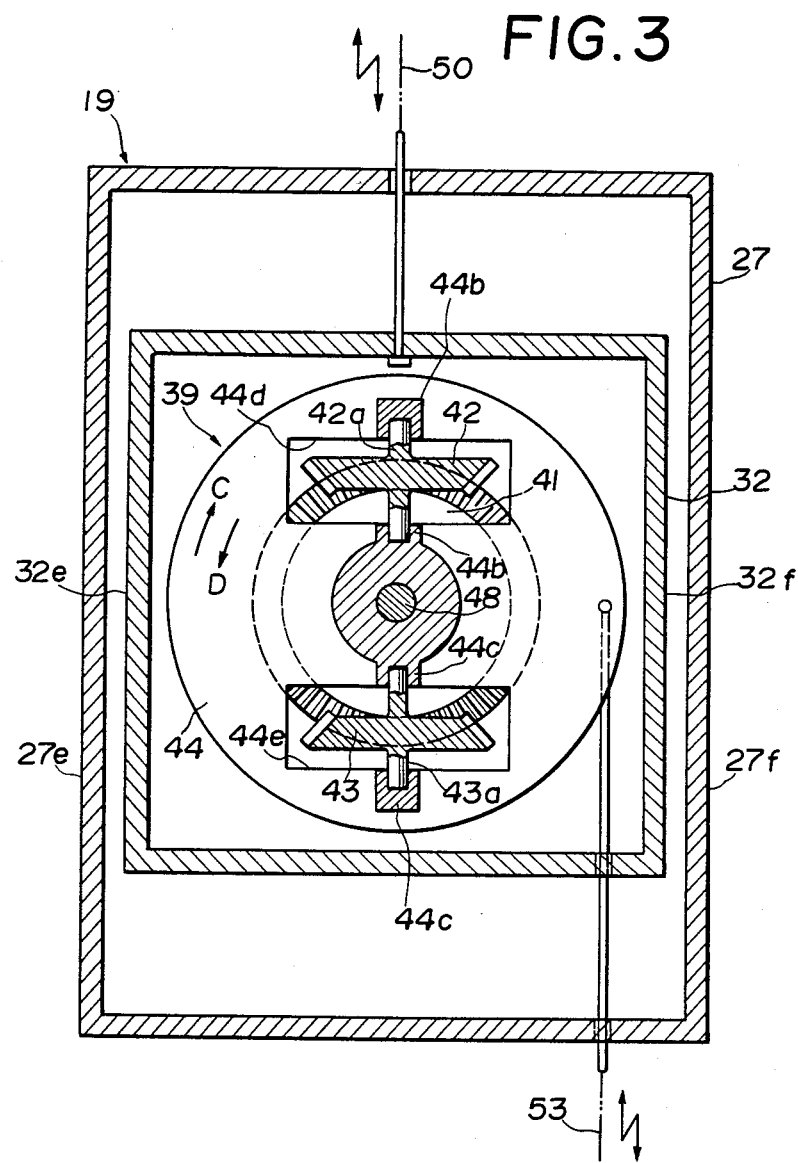
FIG. 3 is a cross-sectional view of the throttle wire control mechanism taken along the line III—III of FIG. 2.

The throttle wire control mechanism 19 will now be described with particular reference to FIGS. 2 and 3. This control mechanism 19 comprises a housing 27 of a rectangular cross-section mounted on the frame of the motorcycle 11 and having upper and lower walls 27a, 27b, side walls 27c, 27d and end walls 27e, 27f. A pair of aligned identical openings 28 and 29 are formed through the opposed side walls 27c and 27d, respectively. An aperture 30 is formed through the upper wall 27a while an aperture 31 is formed through the lower wall 27b.

An inner casing 32 of a rectangular shape is accommodated within the housing 27 in spaced relation thereto, the inner casing 32 having upper and lower walls 32a, 32b, side walls 32c, 32d and end walls 32e, 32f. As best shown in FIG. 2, a pair of aligned apertures 34 and 35 are formed through the side walls 32c and 32d, respectively. An aperture 37 is formed through the upper wall 32a while an aperture 38 is formed through the lower wall 32b.

A differential gear mechanism 39 is mounted within the inner casing 32 and comprises four bevel gears 40, 41, 42, 43 and a disc member 44. The bevel gear 40 has a central hub 40a rotatably received in the aperture 34 of the inner casing 32 through a collar 45 so that the bevel gear 40 is rotatable about the hub 40a relative to the inner casing 32. The bevel gear 41 which is identical in construction to the bevel gear 40, has a central hub 41a rotatably received in the aperture 35 of the inner casing 32 through a collar 46. The bevel gear 40 is disposed coaxially with the bevel gear 41.

A shaft 48 extends between and is supported by the opposed bevel gears 40 and 41, the shaft 48 being disposed coaxially with the bevel gears 40 and 41. The disc member 44 is rotatably mounted on the shaft 28 at its central hub 44a. The disc member 44 has a pair of diametrically opposed bearing portions 44b and 44c. The bevel gear 42 has an integral shaft portion 42a journalled in the bearing portion 44b and central hub 44a of the disc member 44 so that the bevel gear 42 is rotatable about the shaft 42 relative to the disc member 44. The bevel gear 42 is in mesh with the bevel gears 40 and 41. Also, the bevel gear 43 is rotatably mounted on the disc member 44 with its integral shaft 43a journalled in the bearing portion 44c and the central hub 44a. The bevel gear 43 is in mesh with the bevel gears 40 and 41. The bevel gear 42 is disposed coaxially with the bevel gear 43 with their respective shaft portions 42a and 43a being in alignment with each other. The disc member 44 has a pair of rectangular openings 44d and 44e, and the bevel gears 42 and 43 extend through the rectangular openings 44d and 44e respectively.

A first portion of an operating wire, such as first throttle wire 50 extends through the aperture 30 of the housing 27 and the aperture 37 of the inner casing 32. The throttle wire 50 is fixedly secured at one end to the upper wall 32a of the inner casing 32 while the other end thereof is connected to an accelerator device, such as a throttle grip 51 (FIG. 1) mounted on a handle pipe 52 of the motorcycle 11.

Nuts 58a and 58b are threaded on the hubs 40a and 41a of the bevel gears 40 and 41, respectively.

The connecting wire 17 is fixedly secured to the hub 40a of the bevel gear 40 at the other end remote from the speed reducer 16, the connecting wire 17 being disposed coaxially with the bevel gear 40. Similarly, the connecting wire 25 is fixedly secured to the hub 41a of the bevel gear 41 at the other end remote from the speed reducer 24, the connecting wire 25 being disposed coaxially with bevel gear 41.

The disc member 44 has an annular portion 44f formed at one face 44g directed away from the bearing portions 44b and 44c. A second portion of the opening of the operating wire, such as second throttle wire 53 is fixedly secured at one end to the disc member 44 immediately adjacent to the annular portion 44f and is held against the face 44g. The second throttle wire 53 extends through the aperture 38 of the inner casing 32 and the aperture 31 of the housing 27 and is connected at the other end to a throttle valve 55 (FIG. 1) of a carburetor 56 of the motorcycle 11.

When the throttle grip 51 is manipulated, the inner casing 32 is moved vertically (FIG. 1) relative to the housing 27. The vertical length l of each of the openings 28 and 29 is so determined that the connecting wires 17 and 25 will not interfere with the housing 27 when the inner casing 32 is vertically moved by the manipulation of the throttle grip 51.

The operation of the anti-slip apparatus will now be described.

(a) As described above, when the slip rate of the rear wheel 22 of the running motorcycle 11 is at the optimum level, the ratio of the rotational speed of the rear wheel 22 to the rotational speed of the front wheel 13 is the optimum value, that is to say, it is equal to the ratio of the reduction ratio of the speed reducer 24 to the reduction ratio of the speed reducer 16. Therefore, the connecting wires 17 and 25 are rotated at an equal speed in opposite directions. Thus, the opposed bevel gears 40 and 41 are rotated at the same speed in opposite directions so that the opposed bevel gears 42 and 43 are only rotated about their respective shaft portions 42a and 43a. Therefore, the disc member 44 is not subjected to rotation and remains stationary. Thus, in this case, the throttling amount of the throttle valve 55 is not controlled by the throttle wire control mechanism 19.

(b) When the slip rate of the rear wheel 22 is above the optimum level, the ratio of the rotational speed of the rear wheel 22 to the rotational speed of the front wheel 13 is also above the optimum value. Therefore, the connecting wire 25 is rotated at a speed higher than the speed at which the connecting wire 17 is rotated, so that the opposed bevel gears 42 and 43 are not only rotated about their respective shaft portions 42a and 43a but also angularly moved about the shaft 48 in a counterclockwise direction C (FIG. 3) together with the disc member 44. This angular movement of the disc member 44 about the shaft 28 causes the throttle valve 55 to move in its closing direction through the second throttle wire 53 to decrease the throttling amount thereof, so that the drive force of the rear wheel 22 is reduced. Thus, although the manipulated throttle grip 51 is held at a selected position, the throttle wire control mechanism 19 automatically operates the second throttle wire 53 to reduce the throttling amount of the throttle valve 55 when the rear wheel 22 is subjected to undue slip, thereby bringing the slip rate of the rear wheel 22 closer to the optimum level.

(c) When the slip rate of the rear wheel 22 is below the optimum level, the ratio of the rotational speed of the rear wheel 22 to the rotational speed of the front wheel 13 is also below the optimum value. Therefore, the connecting wire 17 is rotated at a speed higher than the speed at which the connecting wire 25 is rotated, so that the opposed bevel gears 42 and 43 are not only rotated about their respective shaft portions 42a and 43a but also angularly moved about the shaft 48 in a clockwise direction D (FIG. 3) together with the disc member 44. This angular movement of the disc member 44 about the shaft 28 causes the throttle valve 55 to move in its opening direction through the second throttle wire 53 to increase the throttling amount thereof, so that the drive force of the rear wheel 22 is increased. Thus, although the manipulated throttle grip 51 is held at a selected position, the throttle wire control mechanism 19 automatically operates the second throttle wire 53 to increase the throttling amount of the throttle valve when the slip rate of the rear wheel 22 is unduly small, thereby bringing the slip rate of the rear wheel 22 closer to the optimum level.

In comparison with a throttle valve control mechanism comprising a servomotor which operates in accordance with a difference between the rotational speeds of the front and rear wheels to control the throttling of the throttle valve, the throttle wire control mechanism 19 is advantageous in that the response of the throttle valve 55 is quicker so that the anti-slip operation can be effected more accurately.

When it is desired to vary the optimum slip rate of the rear wheel 22, this can be easily done by changing the arrangements of the gears of the speed reducers 16 and 24.

The speed reducers 16 and 24 and the sensor wires 15 and 23 may be omitted, and instead the front and rear wheel speed sensors 12 and 21 may be so modified that they are directly connected to the respective connecting wires 17 and 25 to rotate them at predetermined speed reduction rates.

Figure 4:
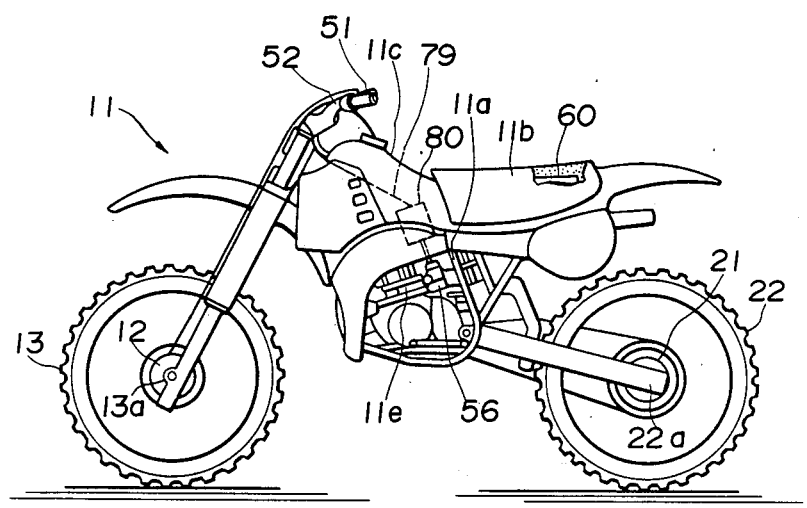
FIG. 4 is a side-elevational view of a motorcycle incorporating a modified anti-slip apparatus.

FIG. 4 shows a motorcycle 11 provided with a modified anti-slip apparatus. A front wheel speed sensor 12 is mounted on a front axle portion 13a for sensing the rotational speed of a front or driven wheel 13 of the motorcycle 11 while a rear wheel speed sensor 21 is mounted on a rear axle portion 22a for sensing the rotational speed of a rear or drive wheel 22. Each of the front and rear wheel speed sensors 12 and 21 is of the conventional type designed to produce a sinusoidal wave of which frequency varies in proportion to the rotational speed of a respective one of the front and rear wheels 13 and 22.

A control unit 60 is mounted on a frame 11a of the motorcycle 11 below a seat 11b and electrically connected to the front and rear wheel speed sensors 12 and 21 through electrical wires. DC motor 61 (FIG. 5) is electrically connected to an output terminal of the control unit 60.

The control unit 60 is responsive to the output signals of the front and rear wheel speed sensors 12 and 21 to determine a slip rate r of the rear wheel 22. The control unit 60 controls the operation of the motor 61 in accordance with the slip rate r. A battery of the motorcycle 11 serves as a power source for the control unit 60.

Figure 5:
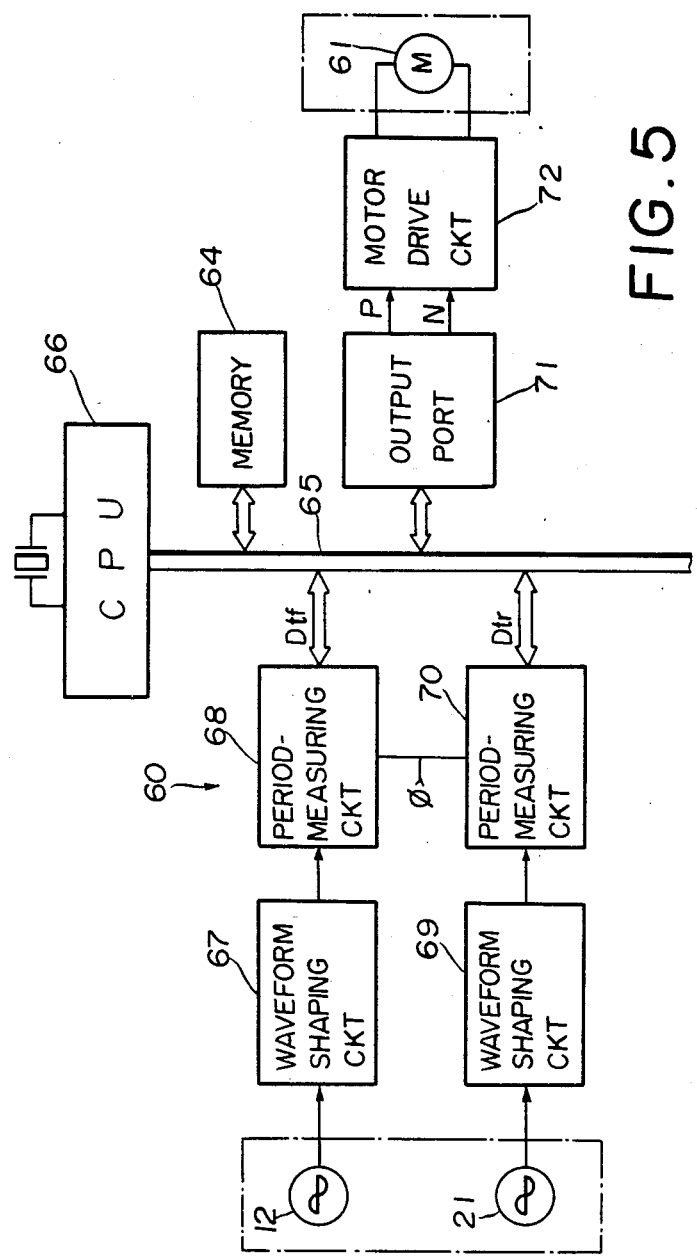
FIG. 5 is a block diagram of the anti-slip apparatus of FIG.4.

The control unit 60 will now be described in more detail with reference to FIG. 5 which shows a block diagram thereof. A memory 64 is connected to a bus 65 of a central processing unit (CPU) 66 such as a microprocessor. The CPU 66 operates in accordance with a program stored in the memory 64. The output signal of the front wheel speed sensor 12 in the form of a sinusoidal wave is applied to a waveform shaping circuit 67 by which the sinusoidal wave is amplified and converted into a rectangular wave. An output signal of the waveform shaping circuit 67 in the form of the rectangular wave is applied to a period-measuring circuit 68 such as a counter. Clock pulses $\phi$ are applied to the period-measuring circuit 68 at predetermined time intervals, and the period-measuring circuit 68 functions to count up the clock pulses $\phi$ during each cycle of the rectangular wave to output digital period date Dtf which is proportional to a period Tf of the sinusoidal wave outputted from the front wheel speed sensor 12. A waveform shaping circuit 69 and a period-measuring circuit 70 are similar in construction to the waveform shaping circuit 67 and the period-measuring circuit 68, respectively. Therefore, the period-measuring circuit 70 outputs digital period data Dtr which is proportional to a period Tr of the sinusoidal wave outputted from the rear wheel speed sensor 21.

An output port 71 produces a binary signal P for rotating the motor 61 in its normal direction and a binary signal N for rotating the motor 61 in its reverse direction under the control of the CPU 66. A motor drive circuit 72 drives the motor 61 in its normal and reverse directions, respectively, in accordance with the binary signals P and N. More specifically, when the binary signal P goes to the 1 state, the drive circuit 72 drives the motor 61 for rotation in its normal direction. Also, when the binary signal N is rendered "1", the drive circuit 72 drives the motor 61 for rotation in its reverse direction.

Figure 6:
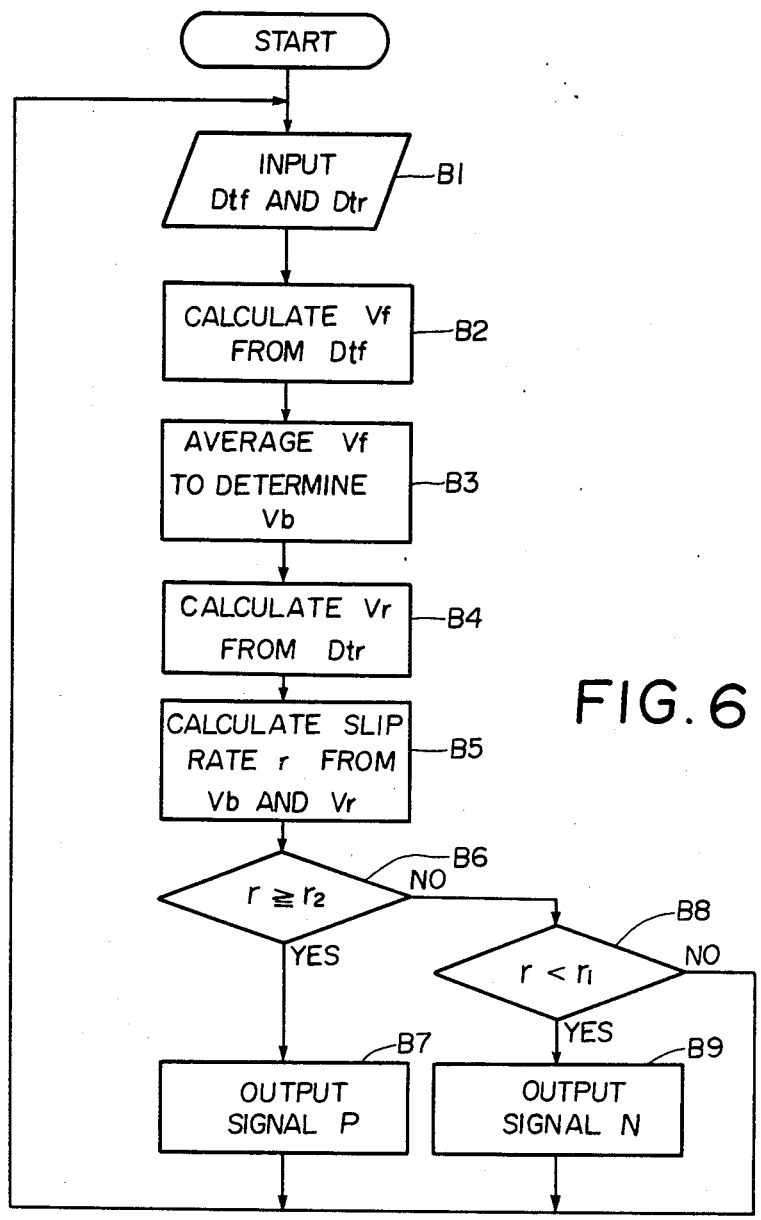
FIG. 6 is a flow chart of a program for carrying out the anti-slip operation of the anti-slip apparatus of FIG. 4.

FIG. 6 shows a flow chart of the program executed by the CPU 66. The operation of the CPU 66 will now be described with reference to this flow chart. The program is periodically executed at predetermined time intervals sufficiently short to accurately carry out the anti-slip operation.

When the execution of the program is started, in Block B1, the CPU 66 inputs thereto the output data Dtf of the period-measuring circuit 68 corresponding to the period Tf of the output signal of the front wheel speed sensor 12 and the output data Dtr of the period-measuring circuit 70 corresponding to the period Tr of the output signal of the rear wheel speed sensor 21. Then, in Block B2, the CPU 66 calculates the peripheral speed Vf of the front wheel 13 from the period data Dtf. More specifically, since the peripheral speed Vf is proportional to a reciprocal number of the period data Dtf, the CPU 66 calculates the peripheral speed Vf by multiplying the reciprocal number of the period data Dtf by a predetermined constant stored in the memory 64. Then, in Block B3, the CPU 66 averages the peripheral speed Vf by a filtering program stored in the memory 64 to determine the estimated vehicle speed Vb. Then, in Block B4, the CPU 66 calculates the peripheral speed Vr of the rear wheel 22 from the period data Dtr in the same manner as described for Block B2. Then, in Block B5, the CPU 66 calculates the slip rate r of the rear wheel 22 from the estimated vehicle speed Vb and the peripheral speed Vr of the rear wheel 22. The slip rate r is represented by the following formula (1):

$$r = (Vr - Vb)/Vb \ldots \qquad (1)$$

Then, in Block B6, the CPU 66 determines whether the slip rate r so obtained is greater than a second reference slip rate $r_2$ used as a reference for the anti-slip operation. If the result is that r is greater than or equal to $r_2$ ($r \geq r_2$), the processing proceeds to Block B7 in which the CPU 66 maintains the binary signal P in the 1 state via the output port 71 for a predetermined time period which is shorter than one cycle of execution of the control program, so that the motor 61 is driven through the motor drive circuit 72 to rotate in its normal direction. Then, the processing returns to Block B1. On the other hand, in Block B6 mentioned above, if the CPU 66 determines that the slip rate r is less than the second reference slip rate $r_2$, the processing proceeds to Block B8 in which the CPU 66 determines whether the slip rate r is less than a first reference slip rate $r_1$ which is less than the second reference slip rate $r_2$. If the result is that the slip rate r is less than the first reference slip rate $r_1$, the processing proceeds to Block B9. In Block B9, the CPU 66 holds the binary signal N in the 1 state through the output port 71 for a time period required for rotating the motor 61 in its reverse direction through an angle equal to the angle through which the motor 61 has been rotated in its normal direction, thereby bringing the motor into its initial position. This angle of normal rotation of the motor 61 has been stored in the memory 64. Then, the binary signal P is rendered "0", and the processing returns to Block B1. On the other hand, in Block B8 mentioned above, if the CPU 66 determines that the slip rate r is greater than or equal to the first reference slip rate $r_1$ ($r \geq r_1$), the processing returns to Block B1 without rotating the motor 61.

Figure 7:
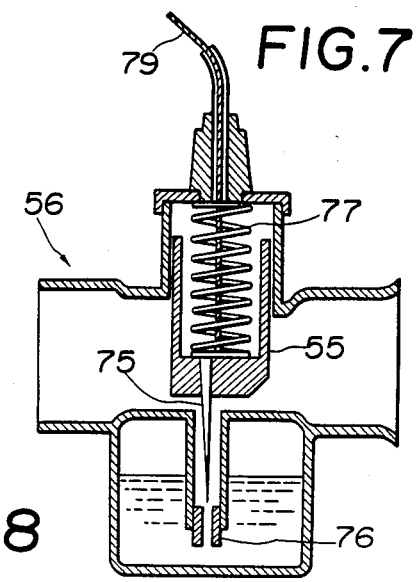
FIG. 7 is a cross-sectional view of a carburetor of an engine of the motorcycle of FIG. 4.

As shown in FIG. 7, a carburetor 56 of the motorcycle 11 is of the conventional type and comprises a throttle valve 55 for controlling the flow of a fuel-air mixture into an engine 11e, a needle 75 mounted on the throttle valve 55 for varying the opening of a main jet 76, and a coil spring 77 for urging the throttle valve 55 in its closing direction.

A throttle wire 79 is connected at one end to a throttle grip 51 mounted on a handle pipe 52 and is also connected at the other end to the throttle valve 55. The operation of the throttle valve 55 is controlled by the manipulation of the throttle grip 51 as is well-known in the art.

Figure 8:
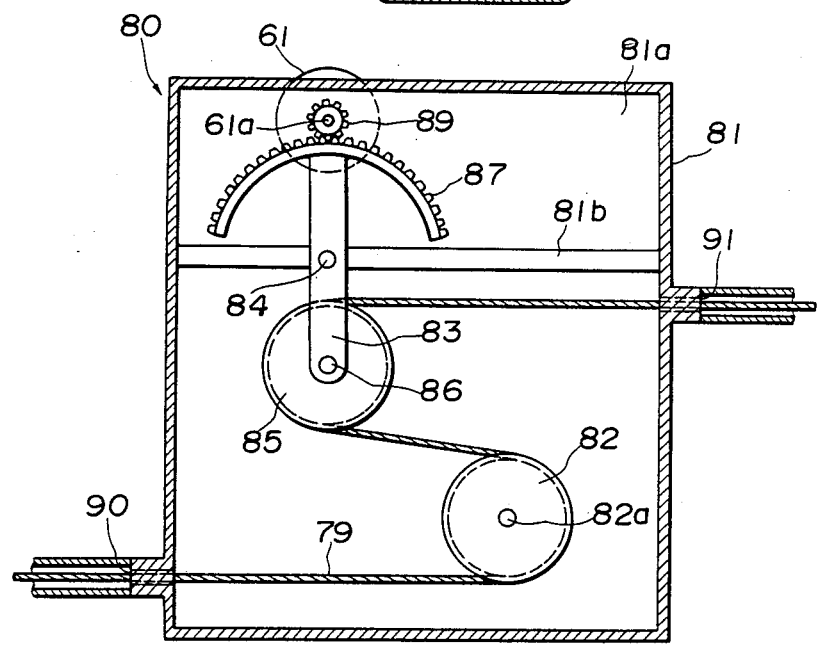
FIG. 8 is a cross-sectional view of a throttle wire control mechanism of the anti-slip apparatus of FIG. 4.

As shown in FIG. 8, the throttle wire 79 passes through a throttle wire control mechanism 80 which serves to vary an effective length of the throttle wire 79 in accordance with the output of the control unit 60. The throttle wire control mechanism 80 will now be described. The throttle wire control mechanism 80 comprises a box-like housing 81 fixedly mounted on the frame 11a below a fuel tank 11c.

A first pulley 82 is mounted on a wall 81a of the housing 81 by a pin 82a for rotation thereabout. An elongated arm 83 is pivotally mounted on a rib 81b of the housing 81 by a pin 84 for rotation or angular movement thereabout, the pin 84 being disposed intermediate the opposite ends of the arm 83. A second pulley 85 is rotatably mounted on one end of the arm 83 by a pin 86. An arcuate rack or gear 87 is fixedly secured to the other end of the arm 83, the arcuate rack 87 having teeth at an outer periphery thereof. The motor 61 is mounted on the exterior of the housing 81 and has an output shaft 61a extending through the housing wall 81a. A pinion 89 is fixedly secured to a free end of the motor output shaft 61a and is in mesh with the arcuate rack 87. The housing 81 has first and second ports 90 and 91. The throttle wire 79 extending from the throttle grip 51 passes through the housing 81 via the first and second ports 90 and 91 and reaches the throttle valve 55. The throttle wire 79 extends around the first and second pulleys 82 and 85 in the housing 81.

The operation of the anti-slip apparatus in this embodiment will now be described.

When the rear wheel 22 is not subjected to undue slip at the time of accelerating the motorcycle 11, the motor 61 is not driven for rotation since the output signals P and N of the output port 71 of the control unit 60 are both in the 0 state. Therefore, in this case, the throttle valve 55 is opened in accordance with the angular movement of the manipulated throttle grip 51, and is held in this position until the throttle grip 51 is further manipulated.

On the other hand, when the motorcycle 11 is abruptly accelerated, the throttle valve 55 is first opened in accordance with the angular movement of the manipulated throttle grip 51. In this case, however, the rear wheel 22 is subjected to undue slip so that the motor 61 is rotated in its normal direction through an angle determined in accordance with the slip rate r calculated by the control unit 60. When the motor 61 is rotated in its normal direction in this manner, the pinion 89 is rotated in a clockwise direction (FIG. 8) so that the arm 83 is angulary moved about the pin 84 in a counterclockwise direction through the arcuate pinion 87. Therefore, the second pulley 85 is also angularly moved in a counterclockwise direction together with the arm 83 so that the length of the throttle wire 79 in the housing 81 is reduced by an amount approximately twice the amount of angular movement of the second pulley 85. As a result, the throttle wire 79 extending from the housing 81 is moved toward the throttle valve 55 by this amount to cause it to move in its closing direction. Thus, when the throttle grip 51 is abruptly manipulated in its accelerating direction so that the rear wheel 22 is subjected to undue slip, the throttle valve 55 is automatically returned in accordance with the slip rate r calculated by the control unit 60. Therefore, the slip rate r of the rear wheel 22 is always controlled to the optimum level during the running of the motorcycle 11. When the slip rate r goes below the first reference slip rate $r_1$, the motor 61 is rotated in its reverse direction through an angle equal to the angle through which the motor 61 has been rotated in its normal direction, so that the second pulley 85 is returned to its initial position.

Although not shown in the drawings, the control unit 60 comprises a mode switch for selectively disenabling the anti-slip operation mentioned above.

Figure 9:
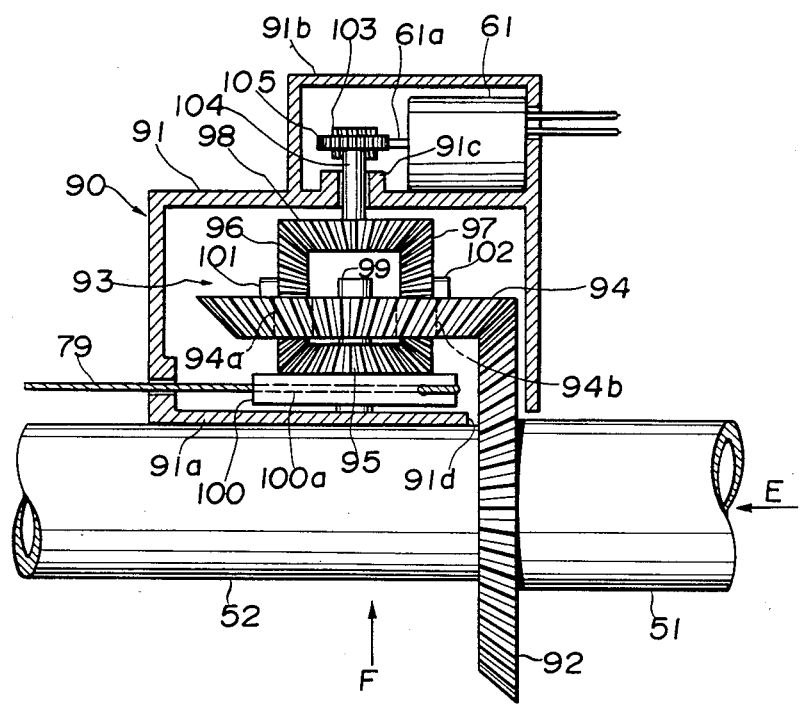
FIG. 9 is a side-elevational view of a throttle wire control mechanism of another modified anti-slip apparatus with its housing broken away.
Figure 10:
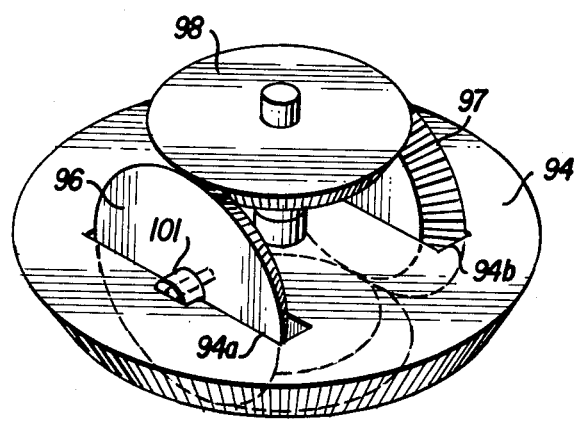
FIG. 10 is a perspective view of a portion the control mechanism illustrated by FIG. 9.

Another modified anti-slip apparatus differs from the anti-slip apparatus shown in FIGS. 4 to 8 only in that the throttle wire control mechanism 80 is replaced by a throttle wire control mechanism 90 shown in FIGS. 9 and 10.

The throttle wire control mechanism 90 comprises a housing 91 fixedly mounted on the handle pipe 52 of the motorcycle 11 adjacent to the throttle grip 51. A bevel gear 92 is fixedly mounted on the throttle grip 51 in coaxial relation thereto for rotation therewith. A gear assembly 93 comprises five bevel gears 94 to 98 is accommodated within the housing 91. The bevel gear 94 is rotatably mounted on a shaft 99 fixedly secured to a wall 91a of the housing 91. The bevel gear 95 is also rotatably mounted on the shaft 99. A disc member 100 is fixedly secured to the bevel gear 95 for rotation therewith about the shaft 99, the shaft 99 extending through the disc member 100 at a center thereof. The bevel gear 94 has a pair of diametrically opposed slots 94a and 94b formed therethrough. The opposed bevel gears 96 and 97 extend through the slots 94a and 94b, respectively, and are mounted on the bevel gear 94 by mounting members 101 and 102 for rotation about their respective axes. The bevel gear 95 is in mesh with the opposed bevel gears 96 and 97.

DC motor 61 is accommodated within a compartment 91b of the housing 91, and a worm gear 103 is fixedly mounted on an output shaft 61a of the motor 61. A shaft 104 is journalled in a bearing portion 91c of the housing 91 and has a gear wheel 105 fixedly secured to one end thereof disposed within the compartment 91b. The bevel gear 98 is fixedly secured to the other end of the shaft 104 and disposed in coaxial relation to the bevel gears 94 and 95. The worm gear 103 mounted on the motor drive shaft 61a meshingly engages the gear wheel 105 so that the rotation of the motor 61 is transmitted to the bevel gear 98 through the shaft 104.

The bevel gear 92 mounted on the throttle grip 51 extends into the housing 91 through an opening 91d and is in mesh with the bevel gear 94. The disc member 100 has a peripheral groove 100a for receiving a throttle wire 79. One end of the throttle wire 79 is fixedly secured to the disc member 100 while the other end is connected to the throttle valve 55 of the carburetor 56 (FIG. 7).

The operation of the anti-slip apparatus in this embodiment will now be described.

When the rear wheel 22 is not subjected to undue slip at the time of accelerating the motorcycle 11, the motor 61 is not driven for rotation since the output signals P and N of the output port 71 of the control unit 60 (FIG. 5) are both in the 0 state. In this case, the throttle grip 51 is manipulated to be angularly moved together with the bevel gear 92 in a counterclockwise direction as viewed in a direction E (FIG. 9), so that the bevel gear 94 is angularly moved about the shaft 99 together with the opposed bevel gears 96 and 97. At this time, since the motor 61 is not rotated, the bevel gear 98 remains stationary. Therefore, the opposed bevel gears 96 and 97 are angularly moved about their respective axes so that the bevel gear 95 is angularly moved about the shaft 99 together with the disc member 100 in a counterclockwise direction as viewed in a direction F (FIG. 9). Thus, the bevel gear 95 is angularly moved in accordance with the angular movement of the manipulated throttle grip 51 so that the throttle wire 79 is wound aound the disc member 100 to open the throttle valve 55 of the carburetor 56.

On the other hand, when the motorcycle 11 is abruptly accelerated, the throttle valve 55 is first opened in accordance with the angular movement of the manipulated throttle grip 51. In this case, however, the rear wheel 22 is subjected to undue slip so that the motor 61 is rotated in its normal direction through an angle determined in accordance with the slip rate r calculated by the control unit 60. When the motor 61 is rotated in its normal direction in this manner, the bevel gear 98 is angularly moved in a counterclockwise direction as viewed in the direction F (FIG. 9), so that the disc member 100, which has been angularly moved in a counterclockwise direction as viewed in the direction F by the manipulation of the throttle grip 51, is angularly moved in a reverse direction, thereby moving the throttle valve 55 in its closing direction. Thus, when the throttle grip 51 is abruptly manipulated in its accelerating direction so that the rear wheel 22 is subjected to undue slip, the throttle valve 55 is automatically returned in accordance with the slip rate r calculated by the control unit 60, so that the slip rate r is controlled to a level below the second reference slip rate $r_2$. When the slip rate r goes below the first reference slip rate $r_1$, the motor 61 is rotated in its reverse direction through an angle equal to the angle through which the motor 61 has been rotated in its normal direction, so that the bevel gear 98 is angularly moved to its initial position. Therefore, the slip rate r of the rear wheel 22 is always controlled to the optimum level during the running of the motorcycle 11.

In this embodiment, although the throttle wire control mechanism 90 is provided adjacent to the throttle grip 51, the mechanism 90 may be provided at any other suitable position on the motorcycle 11, in which case another throttle wire is operatively connected between the throttle grip 51 and the bevel gear 94 so as to actuate this gear upon manipulation of the throttle grip 51, with the bevel gear 92 being omitted.

Conventionally, when the rear wheel is subjected to undue slip, the driver manipulates the throttle grip in a delicate manner to lower the rotational speed of the rear wheel. With the anti-slip apparatuses according to the present invention, however, such slip of the rear wheel can be suitably prevented without resort to the above-mentioned delicate manipulation of the throttle grip, thereby providing a sufficient tire traction. Therefore, the driver can operate the vehicle in a stable manner even on bad roads at the time of acceleration. In addition, the rear wheel is prevented from running idle so that a fuel consumption rate is improved.

While the anti-slip apparatuses according to the invention have been specifically shown and described herein, the invention itself is not to be restricted to the exact showing of the drawings or the description thereof. For example, although the anti-slip apparatuses are adapted for use in the carburetor-engine vehicle, they can be employed for a fuel injection-engine vehicle.

What is claimed is:

1. A anti-slip apparatus for a wheeled vehicle having a drive wheel, a driven wheel, an engine, a fuel control means for controlling a supply of fuel-air mixture to the engine, and an accelerator means operatively connected to the fuel control means by an operating wire, said apparatus comprising:

(a) a drive wheel speed sensor for sensing a rotational speed of the drive wheel;

(b) a driven wheel speed sensor for sensing a rotational speed of the driven wheel; and (c) a wire control means operatively connected to said drive and driven wheel speed sensors and operable to activate the operating wire to reduce the supply of fuel-air mixture from the fuel control means to the engine when the ratio of the rotational speed of the drive wheel to the rotational speed of the driven wheel exceeds a predetermined level.

2. An anti-slip apparatus according to claim 1, in which said drive and driven wheel speed sensors comprise respective connecting wires which rotate at an equal speed when said ratio is at said predetermined level, said wire control means comprising a casing movably mounted on the vehicle and a differential gear assembly contained in said casing, said gear assembly comprising coaxially opposed first and second bevel gears rotatably supported on said casing, and coaxially opposed third and fourth bevel gears meshingly engaging said first and second bevel gears for rotation about their respective axes, said third and fourth bevel gears being supported on said casing for angular movement about the axes of said first and second bevel gears, said connecting wires being fixedly connected to said first and second bevel gears for rotating them, said operating wire comprising first and second portions, said first portion being connected at opposite ends to the accelerator means and said casing, said second portion being connected at one end to the fuel control means and also operatively coupled to said third and fourth bevel gears at the other end, so that upon angular movement of said third and fourth bevel gears about the axes of said first and second gears, said second portion of the operating wire is moved to vary the supply of fuel-air mixture from the fuel control means to the engine.

3. An anti-slip apparatus according to claim 1, in which said drive and driven wheel speed sensors produce first and second sensing signals representing the rotational speeds of the drive and driven wheels, respectively, said wire control means comprising a control unit responsive to said first and second sensing signals for producing a control signal representative of said ratio, and a drive control means responsive to said control signal for activating the operating wire.

4. An anti-slip apparatus according to claim 3, in which said wire control means comprises a housing mounted on the vehicle, an electric motor mounted on said housing and being responsive to said control signal to be driven for rotation, a first pulley rotatably supported on said housing, an elongated arm pivotally supported on said housing, and a second pulley rotatably supported on one end of said arm in spaced relation to said first pulley, the operating wire passing through said housing and extending around said first and second pulleys, said arm being operatively connected to said motor at the other end thereof for being pivotally moved together with said second pulley upon rotation of said motor to vary the effective length of the operating wire.

5. An anti-slip apparatus according to claim 4, in which said arm has a gear portion at the other end thereof, said motor having an output shaft on which a pinion is fixedly mounted, said pinion meshingly engaging said gear portion of said arm.

6. An anti-slip apparatus according to claim 3, in which said wire control means comprises a housing mounted on the vehicle, an electric motor mounted on said housing and being responsive to said control signal to be driven for rotation, and a gear mechanism contained in said housing, said gear mechanism comprising a first gear rotatably supported on said housing, coaxially opposed second and third bevel gears extending through and mounted on said first gear for rotation about their respective axes, a fourth bevel gear rotatably supported on said housing in coaxial relation to said first gear and meshingly engaging said opposed second and third bevel gears, and a fifth gear rotatably supported on said housing and operatively connected to said motor for being driven for rotation, said fifth bevel gear meshingly engaging said second and third bevel gears, the operating wire being connected to said fourth bevel gear, the acceleration means being operatively connected to said first gear for rotating it about its axis so that upon rotation of said first gear, said fourth gear is rotated in one direction through said opposed second and third gears to move the operating wire, and whereby upon rotation of said motor, said fourth bevel gear being rotated in the other direction through said fifth, second and third bevel gears to reduce the supply of fuel-air mixture from the fuel control means to the engine.

7. An anti-slip apparatus according to claim 6, in which the accelerator means comprises a manually-operative throttle grip mounted on the vehicle for rotation about its axis, a sixth gear being fixedly mounted on said throttle grip for rotation therewith, said wire control means being disposed adjacent to said throttle grip, and said sixth gear being in mesh with said first gear to transmit the rotation of said throttle grip thereto.

* * * * *